United States Patent
Schmidt, Jr.

[11] Patent Number: 5,672,004
[45] Date of Patent: Sep. 30, 1997

[54] LIGHTING APPARATUS AND RELATED METHOD

[75] Inventor: Edward A. Schmidt, Jr., Mandeville, La.

[73] Assignee: IMO Industries, Inc., New Orleans, La.

[21] Appl. No.: 707,007

[22] Filed: Sep. 3, 1996

[51] Int. Cl.[6] ..................................... F21S 1/10
[52] U.S. Cl. .................... 362/421; 362/287; 362/372
[58] Field of Search ........................... 362/226, 287, 362/372, 421

[56] References Cited

U.S. PATENT DOCUMENTS

| | | | |
|---|---|---|---|
| 1,776,004 | 9/1930 | Luders. | |
| 2,504,866 | 4/1950 | Morse | 240/26 |
| 3,803,400 | 4/1974 | Ozawa | 240/61 |
| 4,245,281 | 1/1981 | Ziaylek, Jr. | 362/61 |
| 4,360,859 | 11/1982 | Ziaylek, Jr. | 362/80 |
| 4,386,391 | 5/1983 | Gulliksen et al. | 362/232 |
| 4,445,163 | 4/1984 | Ziaylek, Jr. | 362/287 |
| 4,636,924 | 1/1987 | Targetti | 362/277 |
| 4,692,844 | 9/1987 | Galerne | 362/3 |
| 4,751,627 | 6/1988 | Usher | 362/421 |
| 5,183,330 | 2/1993 | Rishel et al. | 362/372 |
| 5,222,801 | 6/1993 | Neer | 362/148 |
| 5,377,087 | 12/1994 | Yoon | 362/275 |
| 5,404,297 | 4/1995 | Birk et al. | 362/421 |

*Primary Examiner*—Carroll B. Dority
*Attorney, Agent, or Firm*—Jansson & Shupe, Ltd.

[57] ABSTRACT

Disclosed is a lighting apparatus of the type having a retainer, a lamp holder held by the retainer, and a lamp secured with respect to such holder. In the improvement, the lamp holder has a pair of support edges spaced from one another by a first dimension. The retainer includes first and second notches, each having a pair of notch edges spaced from one another by a second dimension which is greater than the first dimension. So configured, the holder may be removed through the notches without having access to the rear of the apparatus. In a specific embodiment, the lamp holder is a sphere truncated along two planes to form an "eyeball-like" structure which may be moved in the retainer for adjusting the position of the light beam. A new method is also disclosed.

17 Claims, 10 Drawing Sheets

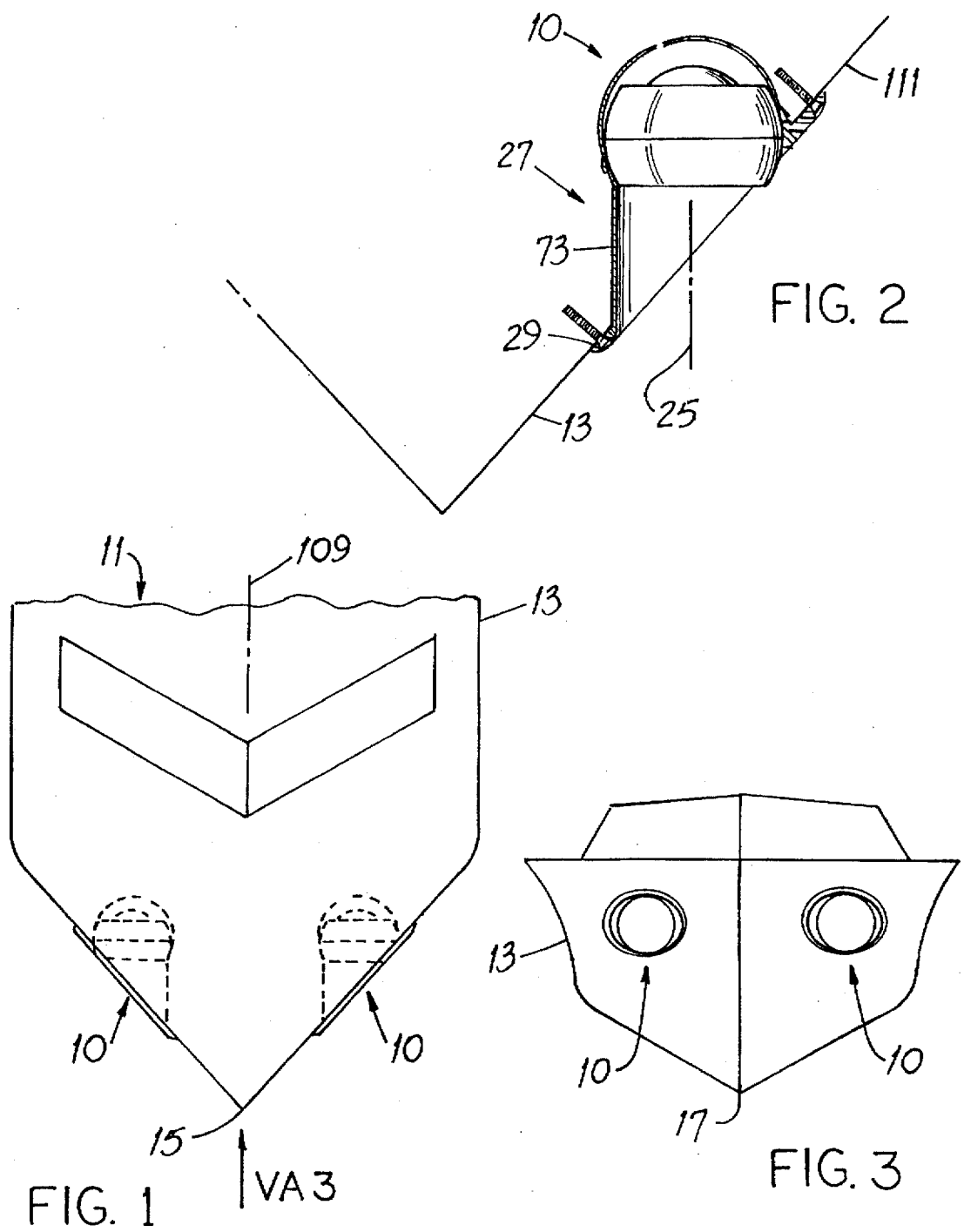

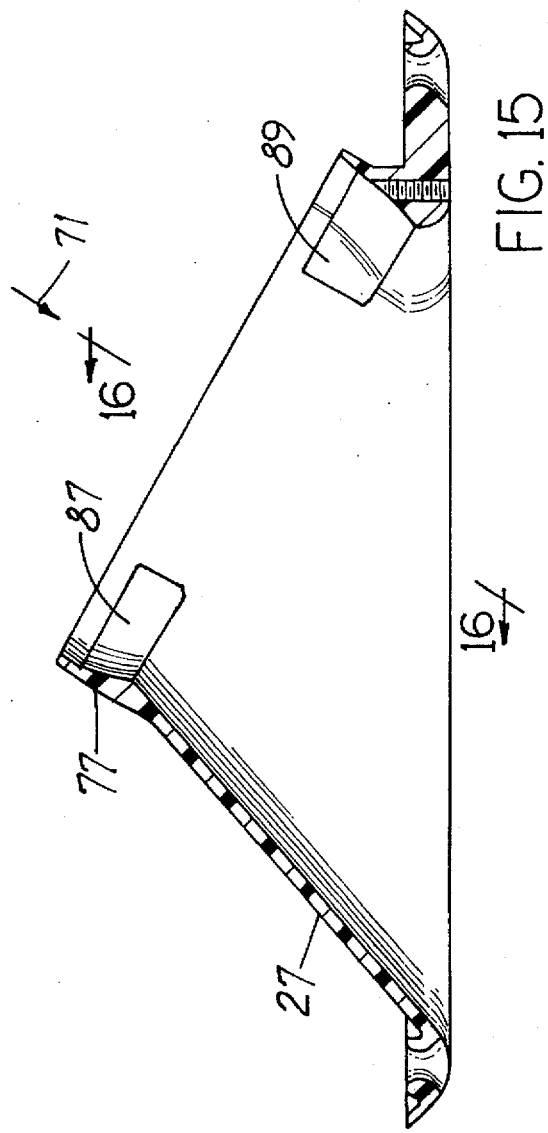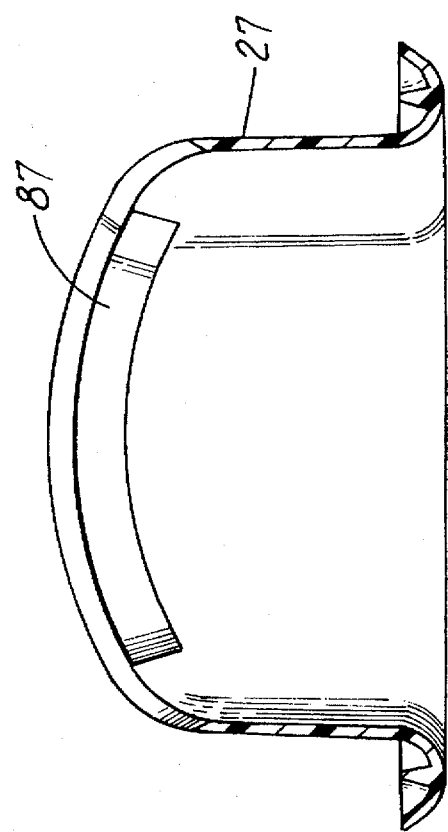

LIGHTING APPARATUS AND RELATED METHOD

FIELD OF THE INVENTION

This invention relates to illumination and, more particularly, to lighting devices having an adjustable or repositionable light source.

BACKGROUND OF THE INVENTION

Lighting device affording an adjustable or repositionable light source are well known. They offer a good deal of convenience since even though a portion of such device may be fixed to a structure, there is a component of such device which can be moved to shift the axis along which the light beam projects. Configurations of this type recognize that the relative positions of the mounting structure and the desired light beam orientation may differ, depending upon the specifics of the particular installation.

Boats represent a type of installation where the ability to adjust the light beam is particularly desirable. If the manufacturer of the lighting device is to be able to offer a single standard product to fit different boats, that product must accommodate hulls of differing profiles. This is usually done by provide a lamp mount which is movable in some sort of retainer.

U.S. Pat. No. 2,504,866 (Morse); U.S. Pat. No. 4,245,281 (Ziaylek, Jr.); U.S. Pat. No. 4,360,859 (Ziaylek, Jr.) and U.S. Pat. No. 4,445,163 (Ziaylek, Jr.) all disclose lighting apparatus for boats. And while such apparatus have been generally suitable for their intended purposes, they are not without disadvantages relating to access and ease of service.

For example, the light assembly disclosed in the Ziaylek, Jr. '281 patent has a hose clamp which is tightened when the lamp is adjusted. Such hose clamp tightening must be from inside the hull. And given the relative sizes of the housing curved section and the lamp socket, there is no doubt that socket removal can only be from inside such hull.

The docking light shown in the Morse patent has an interior flange and an exterior clamp ring, both of which are held in place by through-bolts passing entirely through both and through the hull. At least the flange must be removed (from inside the hull) before the lamp holder can be removed, also from inside the hull.

The boat lights disclosed in the Ziaylek, Jr. patents approach the matter of serviceability in a different way, i.e., by having a major portion of such lights protrude exteriorly of the hull. The propensity to be broken by, e.g., a collision with a dock, is increased but, often, serviceability is no easier. The boat light shown in the Ziaylek, Jr. '859 patent has a headlamp held in position by a metal clamp ring which must be tightened from inside the hull.

"Inside-the-hull" service may be quite difficult. Bow underdeck space is sometimes crammed with gear and is usually dark. And the working room and headspace often leaves much to be desired.

A new lighting apparatus which is adjustable, which may be adapted to a wide variety applications including but not limited to boats and which needs no rear access to remove, replace and electrically reconnect the lamp holder and the lamp would be an important advance in the art.

OBJECTS OF THE INVENTION

It is an object of the invention to provide an improved lighting apparatus and related method overcoming some of the problems and shortcomings of the prior art.

Another object of the invention is to provide an improved lighting apparatus which is easy to service from the front of such apparatus.

Another object of the invention is to provide an improved lighting apparatus and method for mounting a lamp holder wherein the method requires no rear access to the apparatus.

Still another object of the invention is to provide an improved lighting apparatus and method for de-mounting a lamp holder wherein the method requires no rear access to the apparatus.

Another object of the invention is to provide an improved lighting apparatus and related method wherein when the apparatus is boat-mounted, there is no need to have inside-the-hull access to such apparatus.

Yet another object of the invention is to provide an improved lighting apparatus and related method which may be readily adapted to a variety of installations including but not limited to installations involving boats. How these and other objects are accomplished will become apparent from the following descriptions and from the drawings.

SUMMARY OF THE INVENTION

The invention involves a lighting apparatus of the type having (a) a retainer, (b) an "eyeball-like" lamp holder held by the retainer, and (c) a lamp secured with respect to the holder. In the improvement, the lamp holder has a pair of support edges spaced from one another by a first dimension. The retainer include at least one notch and, most preferably, includes first and second opposed notches.

Each notch has a pair of notch edges spaced from one another by a second dimension greater than the first dimension so that there is slight clearance between the holder and the notch edges when the holder is properly oriented for installation or removal. This configuration permits the holder to be mounted and removed through the notches, i.e., without having to gain access to the rear or wiring side of the apparatus. The new apparatus is dramatically easier to service that earlier apparatus of the general type.

Considered in another way, the retainer component of the apparatus has a retainer body around a spatial region. A pair of rigid, blade-like retention members extend from the body into the region and the notches are between the retention members. In an embodiment where the lamp holder is generally circular, such holder has an axis coincident with a holder diameter and the notches are in registry with the axis.

In a more specific aspect of the invention, the lamp has a reflector for directing a light beam along a reflecting axis. The lamp has a rim portion and a lens forward of the rim portion. The retainer includes a first portion forward of the rim portion and spaced from the reflecting axis and the notches are between the rim portion of the lamp and the first or forward portion of the retainer.

In another specific embodiment, the apparatus has a protective shroud rearward of the rim portion and around the rear or connection side of the lamp to generally enclose such rear side. The shroud is coupled to the retainer and obstructs rearward removal of the holder. In the invention, such shroud presents no service problem since the holder is removable forward through the notches.

In other aspects of the invention, the lamp holder is a truncated sphere having a radius of curvature which is also referred to as a "first radius of curvature." Each notch has a boundary extending between its edges and the boundary of at least one notch defines an arc. This arc has a second radius of curvature which is slightly greater than the first radius of curvature. "Clearance" is thereby provided to permit removal and installation of the lamp holder through the notch. In a highly preferred embodiment, the boundaries of both notches define an arc having a second radius of curvature greater than the first radius of curvature. And, preferably, such second radii of curvature are equal to one another.

An optional but convenient feature of the new apparatus helps retain the lamp holder (and therefore the lamp) in a selected position. The apparatus includes a snubber, e.g., a rubber screw or a rubber-tipped screw, extending through the retainer and contacting the holder to substantially prevent movement of such holder.

One application of the new apparatus is as a docking light for a boat having a hull with a hull long axis. The retainer has a body extending along a body axis and has a flange-like face mounted at the hull exterior surface. The face is angular to the body axis and the body axis and the hull long axis are substantially parallel to one another.

Another aspect of the invention involves a method for mounting a lamp holder which mounts a lamp secured with respect to such holder. The method includes providing a retainer having a body extending along a body axis, and also having a notch formed in the retainer. The lamp holder is oriented so that the reflecting axis is angular to the body axis and, most preferably, so that such reflecting axis is about perpendicular to such body axis. The holder is then urged through the notch and, thereafter, the holder is re-oriented so that the beam axis and the body axis are substantially coextensive.

In a more specific aspect, the notch is a first notch, the retainer has a second notch therein and the urging step includes urging the holder through both notches. A highly preferred lamp holder is a sphere truncated along edges spaced from one another and in registry with respective planes perpendicular to the reflecting axis.

When the holder is so configured, the orienting step includes orienting the holder so that the planes are angular to the body axis. And the re-orienting step includes moving the holder so that the planes are about perpendicular to the body axis. The new method may also includes steps for de-mounting the lamp holder. Such steps includes turning the holder so that the reflecting axis is angular to the body and then withdrawing the holder from the body through the notch.

Further details of the invention are set forth in the following detailed description and in the drawings.

BRIEF DESCRIPTION OF THE DRAWINGS

FIG. 1 is a top plan view of a boat hull having a pair of the new light apparatus mounted therein. Parts are broken away and surfaces of other parts are shown in dashed outline.

FIG. 2 is an enlarged view of the boat hull and one of the apparatus of FIG. 1. Parts are shown in cross-section and other parts are broken away.

FIG. 2 is a front elevation view of the boat hull and apparatus of FIG. 1 taken along the viewing axis VA3 thereof.

In FIG. 13, the lamp is concealed from view.

FIG. 15 is a section view of the retainer of FIG. 14 taken along the viewing plane 15—15 thereof.

FIG. 16 is a section view of the retainer of FIG. 15 taken along the viewing plane 16—16 thereof.

DETAILED DESCRIPTIONS OF PREFERRED EMBODIMENTS

Before describing the new lighting apparatus 10 and related method, it will be helpful to have an understanding of some of the different types of applications on which such apparatus 10 may be used. FIGS. 1, 2 and 3 show a boat 11 having a hull 13 with two of the apparatus 10 mounted therein. Mounting is at the bow 15 with one apparatus 10 on either side of the keel line 17.

Figure 4:
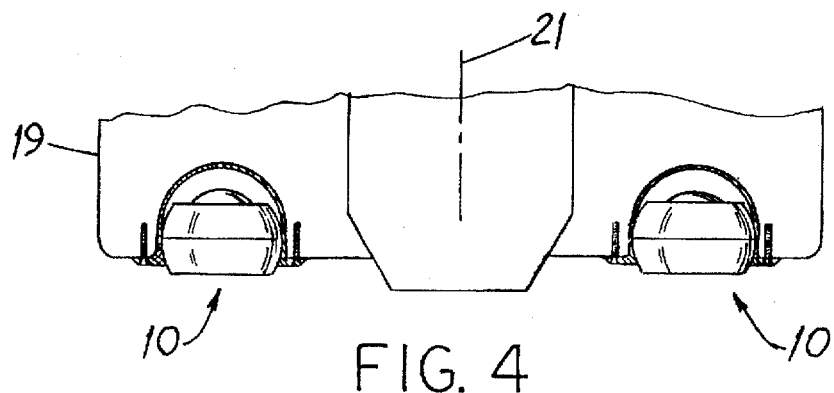
FIG. 4 is a top plan view of a mobile machine embodied as a motor vehicle having two of the new lighting apparatus mounted therein. Parts are broken away and surfaces of other parts are shown in dashed outline.
Figure 5:
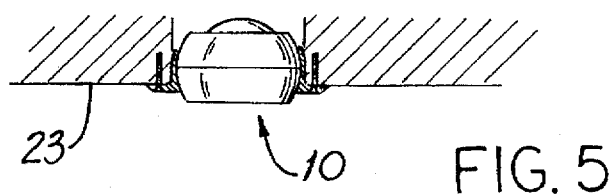
FIG. 5 is a representative top plan section view showing one of the new lighting apparatus mounted in a building.
Figure 6:
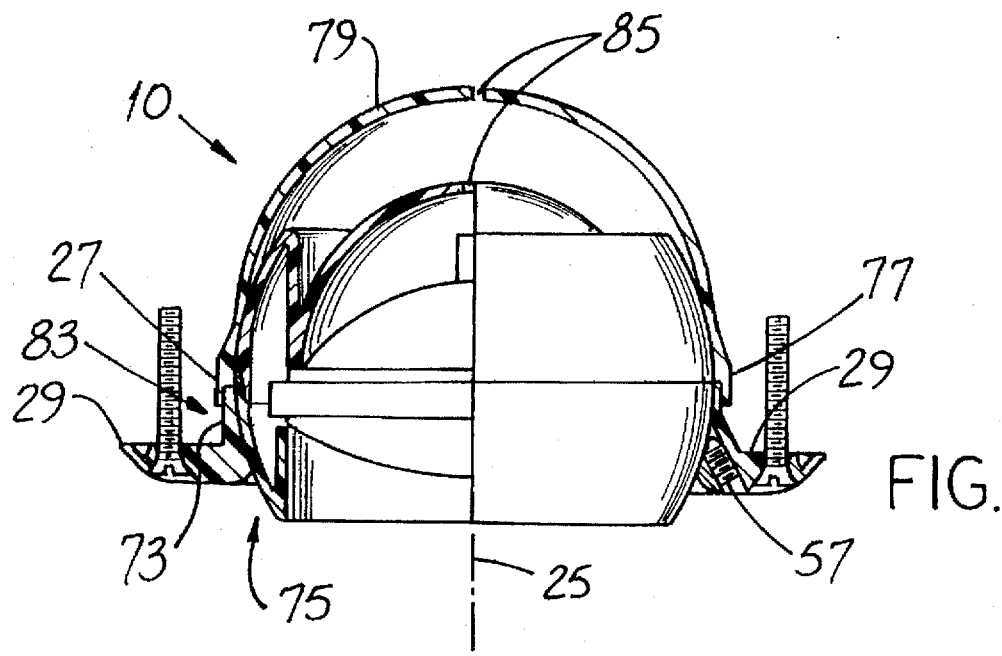
FIG. 6 is a top plan view of one embodiment of the new lighting apparatus suitable for use in a motor vehicle or a building. Portions of parts are shown in cross-section.

FIG. 4 shows a motor vehicle 19 having a pair of the apparatus 10 mounted thereon, one on either side of the vehicle long axis 21. Such vehicle 19 may be an off-road recreational vehicle, a commercial vehicle or even a passenger auto. FIG. 5 shows the new apparatus 10 mounted in the wall 23 of a building. And it is possible that the apparatus 10 may find use on aircraft. In the embodiment of FIGS. 4, 5, and 6, the body axis 25 of the retainer 27 of the apparatus 10 is substantially perpendicular to the mounting face.

Figure 7:
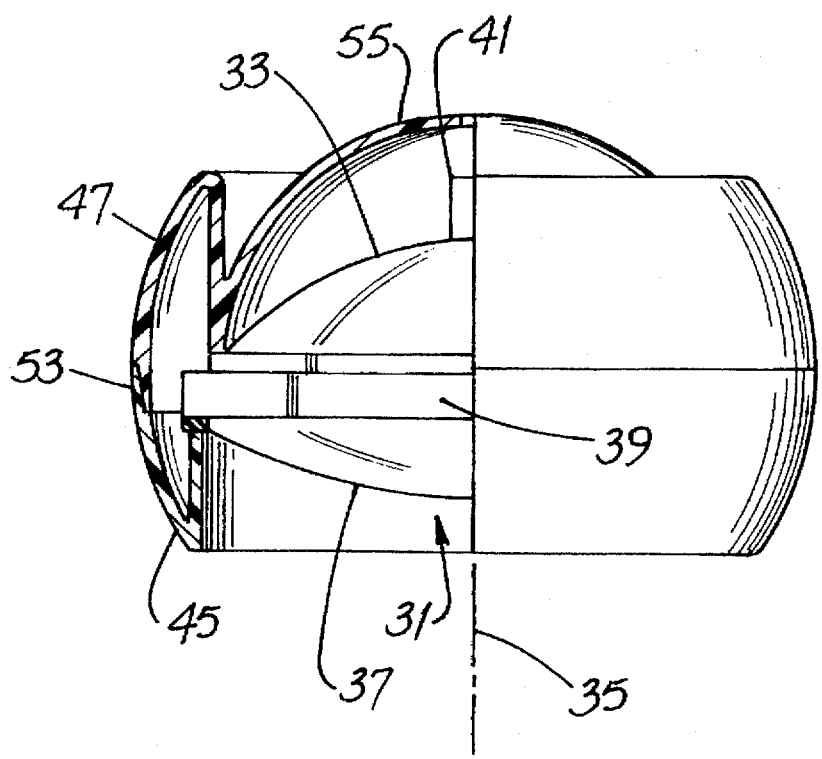
FIG. 7 is a top plan view of the lamp holder and lamp used in the inventive apparatus. Portions of parts are shown in cross-section.
Figure 9:
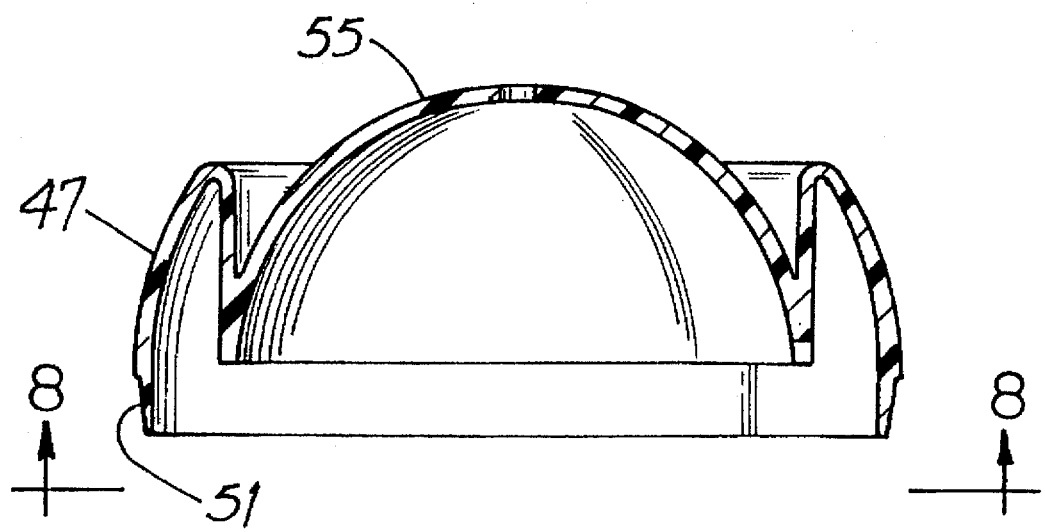
FIG. 9 is a section view of the shell component of FIG. 8 taken along the viewing plane 9—9 thereof.
Figure 8:
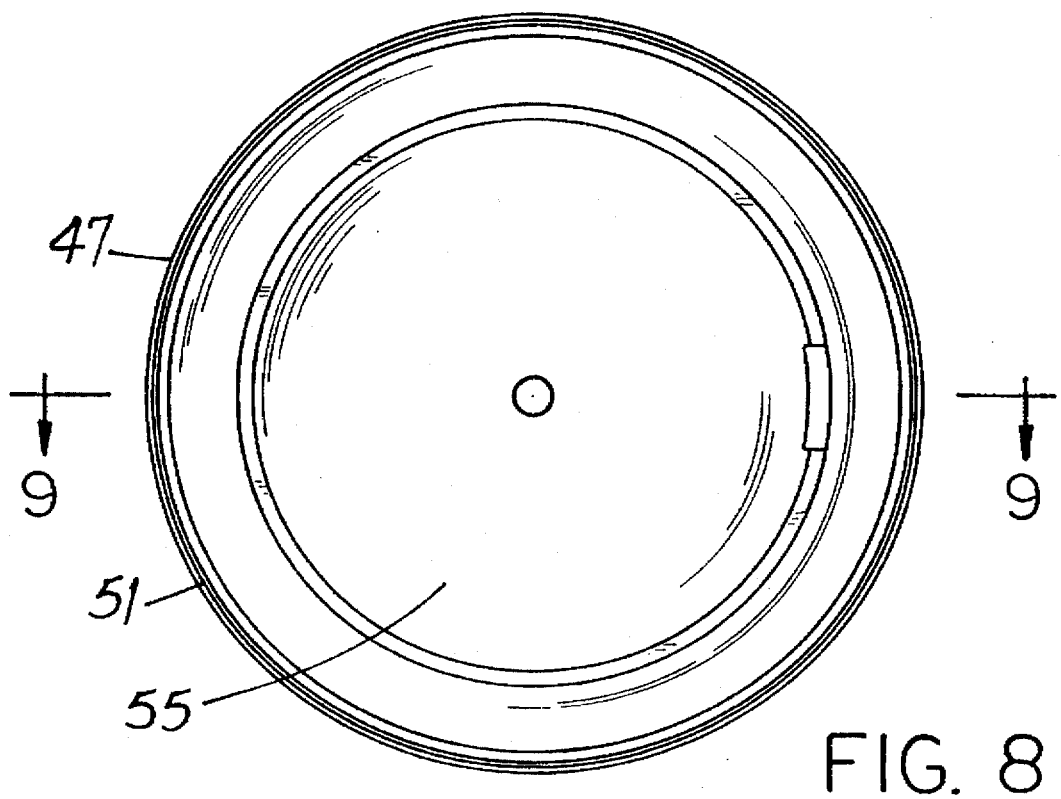
FIG. 8 is a front elevation view of the rear shell component of the lamp holder used in the inventive apparatus.
Figure 10:
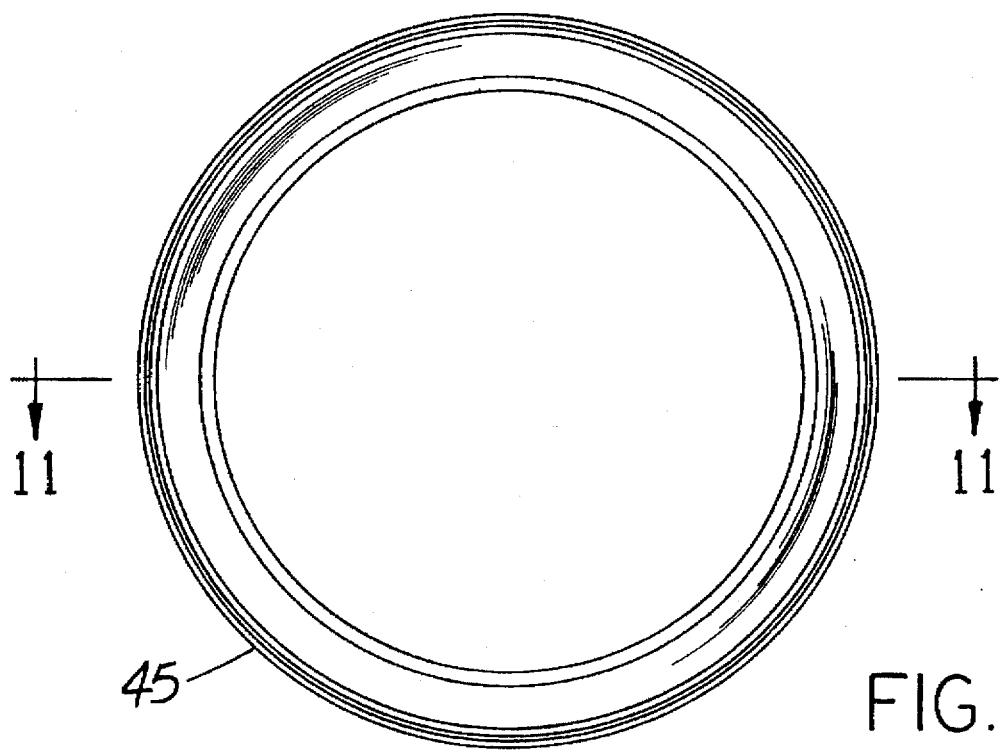
FIG. 10 is a front elevation view of the front shell component of the lamp holder used in the inventive apparatus.
Figure 11:
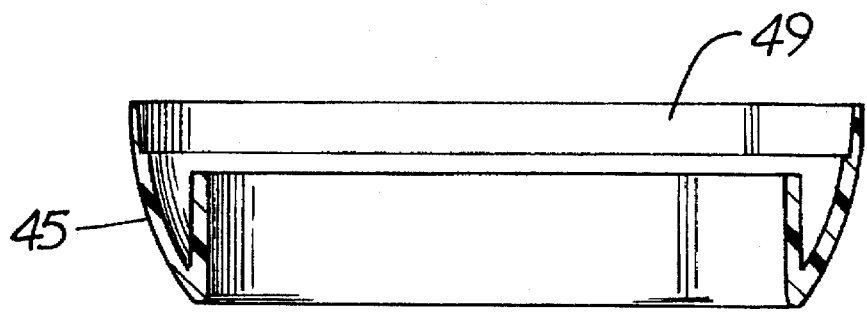
FIG. 11 is a section view of the shell component of FIG. 10 taken along the viewing plane 11—11 thereof.

Referring next to FIG. 7, a general overview description of the new apparatus 10 will now be set forth. Such apparatus 10 includes a lamp 31, preferably of the round, sealed-beam type. The lamp 31 has a rear reflector 33 for reflecting light along a reflecting axis 35. There is a clear front lens 37 through which light is emitted and there is a rim portion 39 intermediate the reflector 33 and the lens 37. The lamp filament is powered by an electrical connection (not shown) coupled to the rear terminal boss 41.

Figure 18:
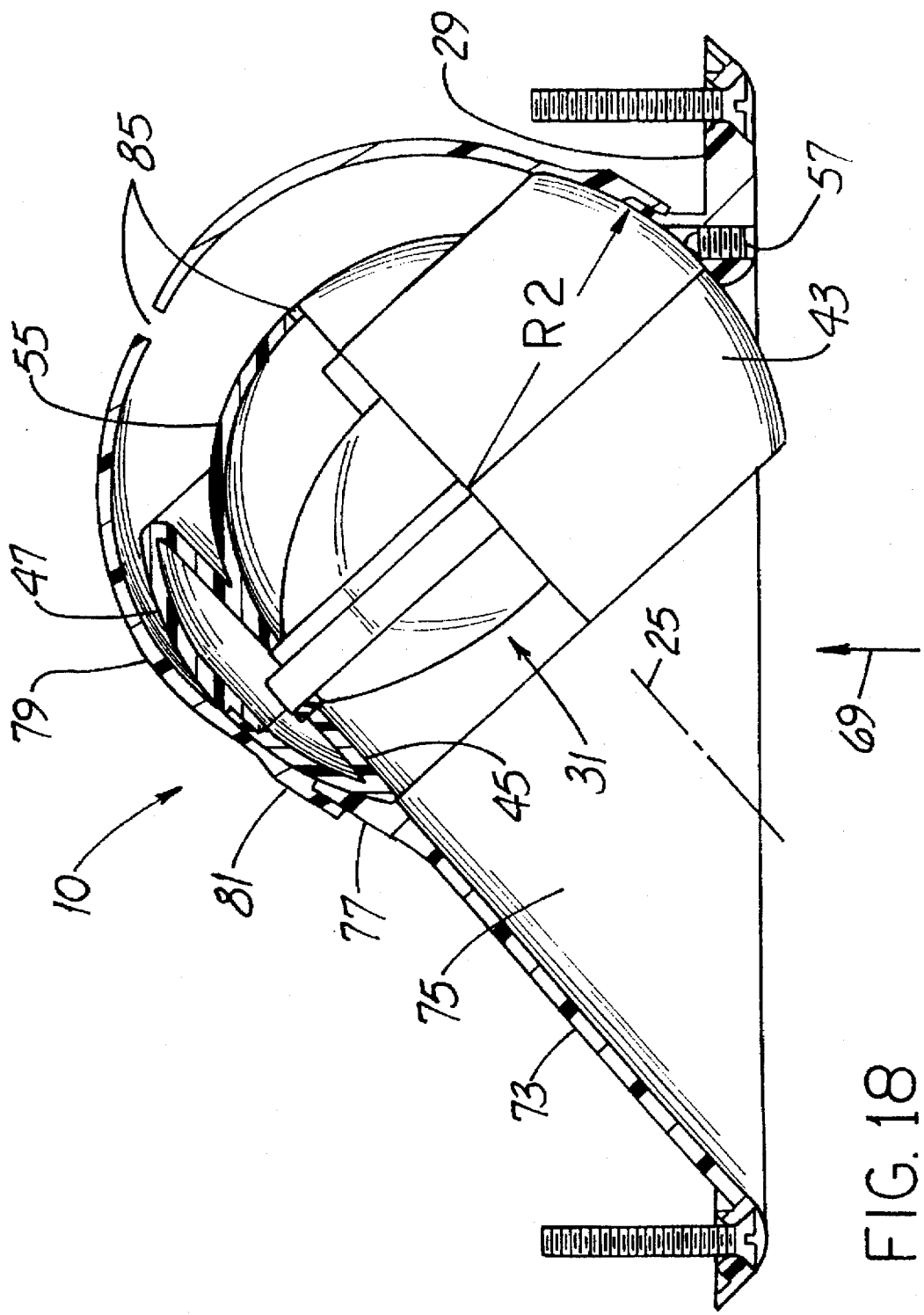
FIG. 18 is a section view of the new lighting apparatus in that embodiment particularly configured for use on boats.

Referring also to FIGS. 8 through 13, the lamp 31 is mounted in a lamp holder 43 comprising two shell components, i.e., front and rear components 45, 47 respectively, which are glued or otherwise bonded together along their respective overlapping surfaces 49 and 51 to a joint 53 as in FIG. 7. The rear component 47 has a protective dome portion 55 adjacent to and spaced rearwardly from the reflector 33. As shown in FIGS. 6 and 18 a snubber 57, e.g., a rubber-tipped screw, extends from the retainer 27 toward the holder 43 and when tightened, such snubber 57 contacts the holder 43 and retains it in its selected position. (It is not unreasonable to refer to the lamp holder 43 and lamp 31 as an "eyeball" because of the way the lamp holder 43 moves in the retainer 27 and the way it and the mounted lamp 31 appear in front view.)

Figure 13:
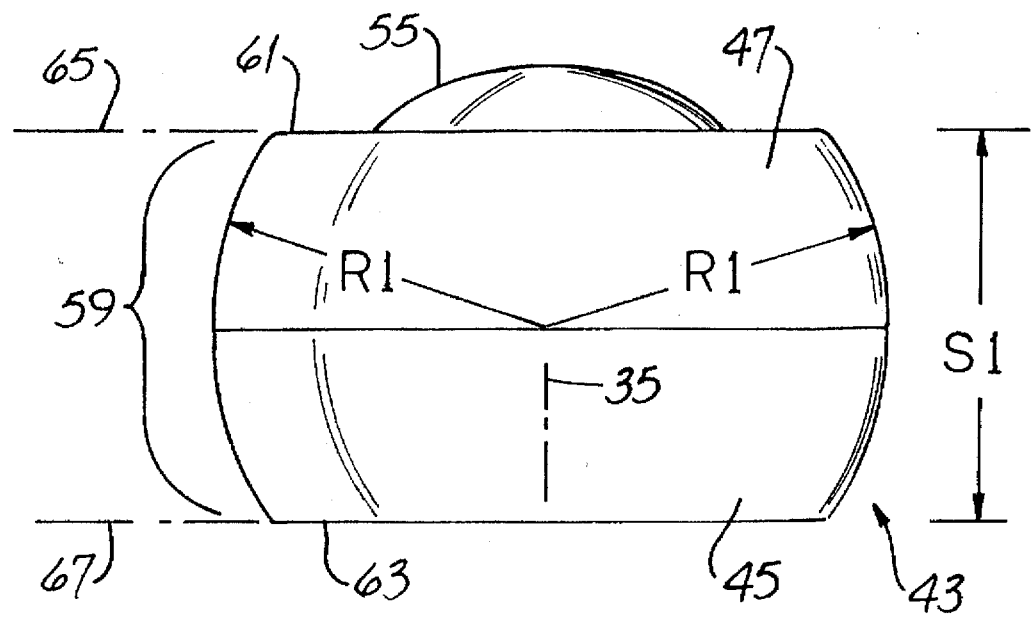
FIG. 13 is a plan view of the lamp holder, the two components of which are shown in FIG. 12.
Figure 12:
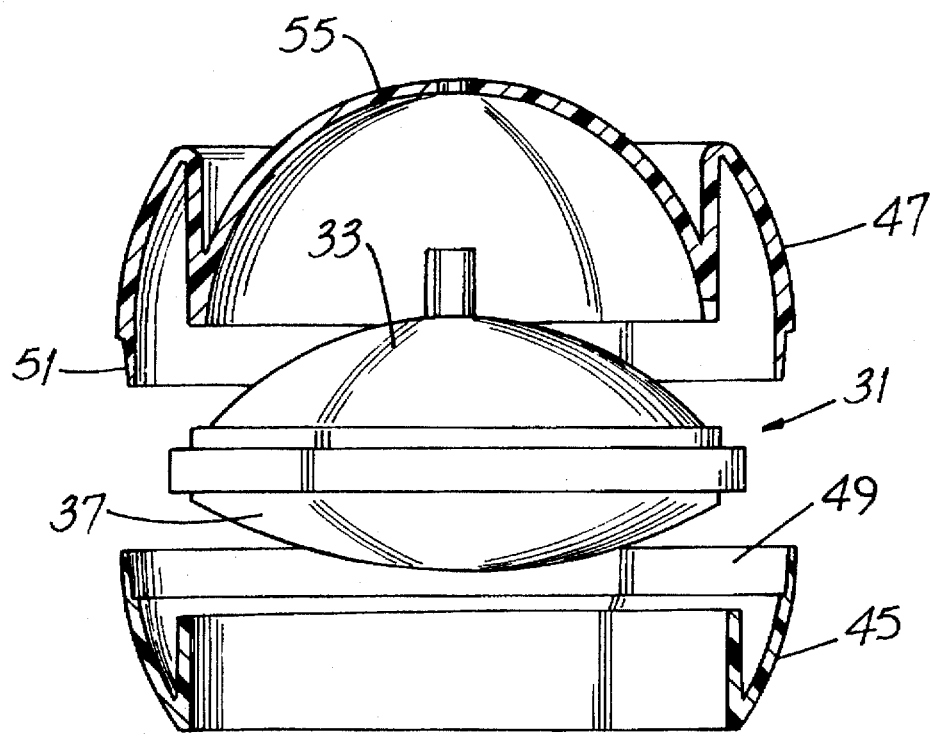
FIG. 12 is an exploded view of the lamp holder and lamp used in the inventive apparatus. The front and rear shell components of the holder are shown in section view and the lamp is shown in full representation.

The components 45, 47 form a support band 59 which contacts and is pivotally movable in the retainer 27 when the holder 43 is installed in such retainer 27. As shown in FIG. 13, the support band 59 has a radius of curvature R1. Such support band 59 is a truncated sphere in that the radius of curvature R1 is constant across the band 59 and the band 59 is truncated along edges 61, 63 spaced from one another and in registry with respective planes 65, 67 perpendicular to the reflecting axis 35. The spacing between edges is denominated S1.

Figure 17:
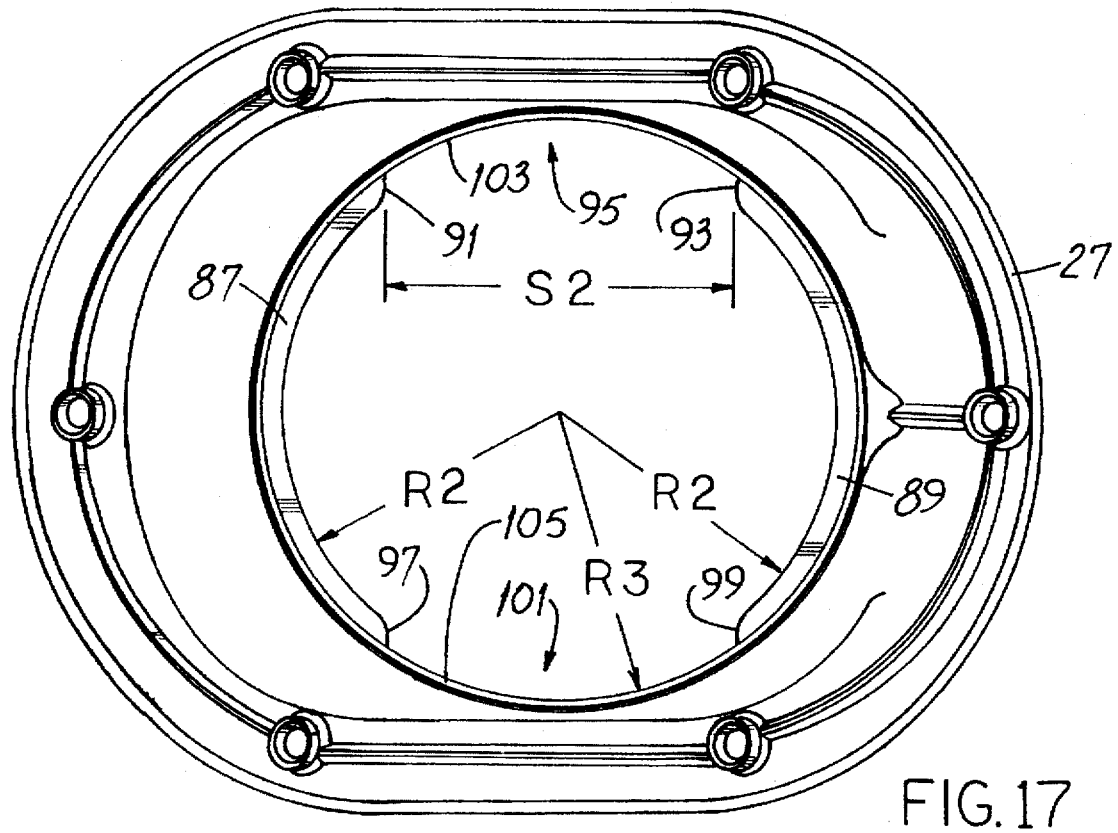
FIG. 17 is a full-representation view of the retainer of FIG. 15 taken along the arrow 71 of FIG. 15.
Figure 14:
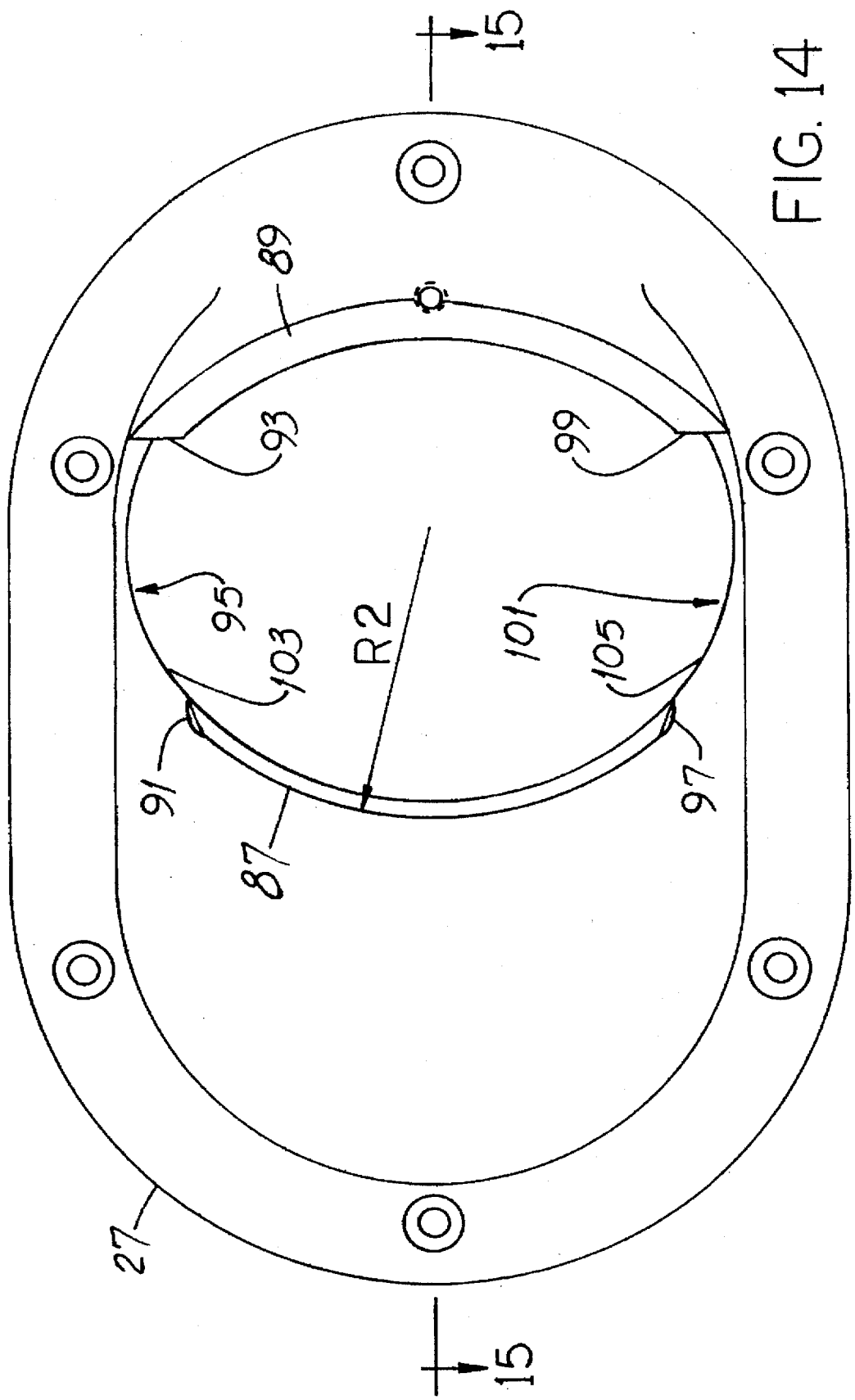
FIG. 14 is an elevation view of the retainer used in another embodiment of the new apparatus particularly configured for use on boats. Such view is along the arrow 69 of FIGS. 15 and 18.

Referring next to FIGS. 6 and 14 through 18, the lamp holder retainer 27 of the new lighting apparatus 10 will now be described. It should be noted that the direction of view of FIG. 14 is along the arrow 69 of FIGS. 15 and 18 and the direction of the view of FIG. 17 is along the arrow 71 of FIG. 15. Such retainer 27 has a mounting face 29 and a retainer body 73 extending from such face 29. The retainer body 73 somewhat resembles a tube, extends along the axis 25 and is around a spatial region 75.

The retainer body 73 terminates in an outwardly-flared engagement flange 77, the radius of curvature R2 of which is about equal to (and in any event only slightly greater than) the radius of curvature R1 of the lamp holder support band 59. When the flange 77 is so configured, the flange 77 and band 59 are in contact with one another and the holder 43 is partially secured in and by such flange 77 for sliding, adjustable movement with respect to such flange 77. In a specific embodiment, a shroud 79 has its edge 81 affixed to the flange 77 at the joint 83. Both the dome portion 55 and the shroud 79 include apertures 85 for wiring from the lamp 31 to a source of electrical power.

Referring particularly to FIGS. 13, 14, 15, 16 and 17, the retainer 27 has a pair of blade-like retention members 87, 89 which extend from the body 73 into the region 75. Like the engagement flange 77, the retention members 87, 89 also have a radius of curvature R2 so that the members 87, 89, are in contact with the lamp holder support band 59 to secure such band 59 and to permit sliding, adjustable movement of the band 59 with respect to the members 87, 89.

Each retention member 87, 89 has a first edge 91 and 93, respectively, and such first edges 91, 93 cooperate to define a first notch 95 therebetween. The spacing S2 between such edges 91, 93 is only slightly greater than the spacing S1 between the edges 61, 63 of the support band 59.

Similarly, each retention member 87, 89 also has a second edge 97 and 99, respectively, and such edges 97, 99 cooperative to define a second notch 101 between them. The spacing between such second edges is also denominated as S2.

While it is possible to configure the boundaries 103, 105 of the notches 95, 101 in other ways and still permit removal of the holder 43 from the retainer 27 (in a manner described below), a highly preferred notch has a boundary defining an arc that has a radius of curvature R3, than the radius of curvature R1 of the support ring.

Figure 19:
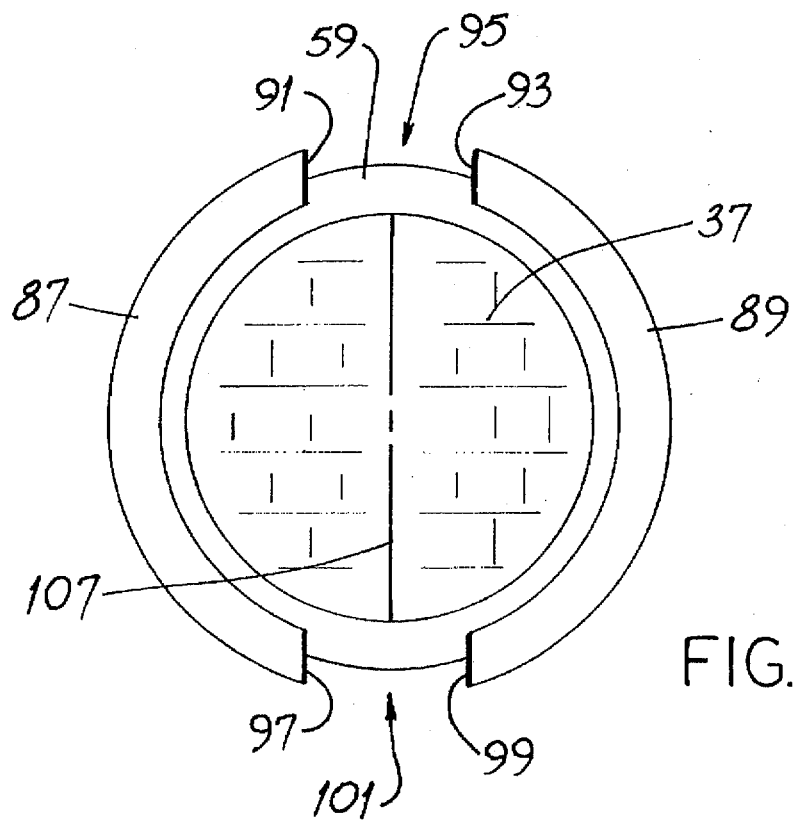
FIG. 19 is a representative front elevation view showing the lamp holder oriented for normal illumination and retained with respect to the apparatus retainer by arc-shaped retention members defining removal notches therebetween.
Figure 20:
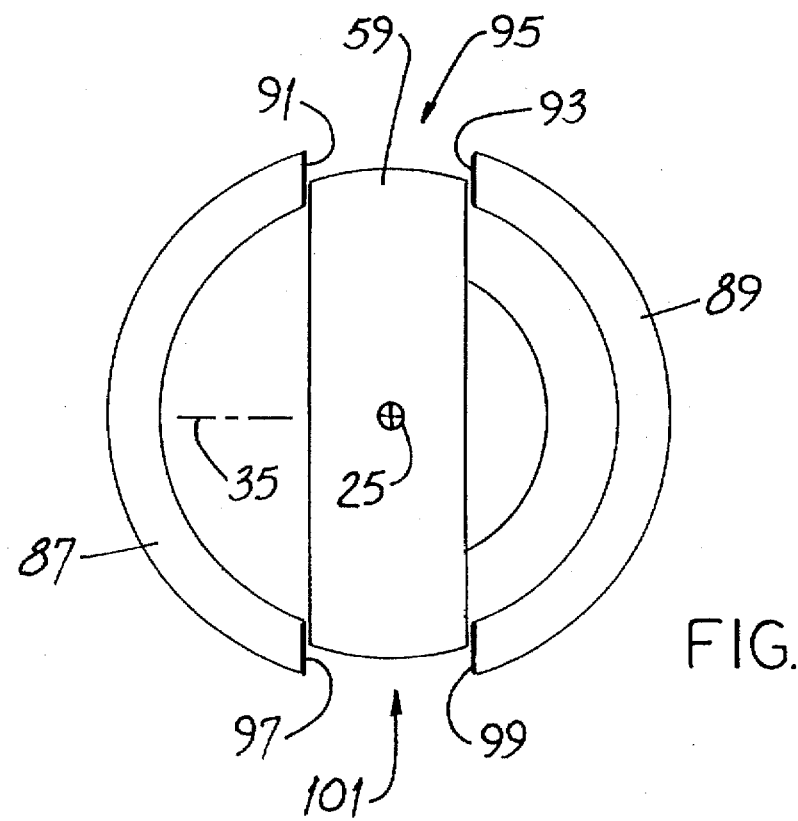
FIG. 20 is a representative front elevation view generally like that of FIG. 19 and showing the lamp holder rotated from its position in FIG. 19 and thereby oriented for removal from the apparatus retainer through the removal notches.

FIGS. 19 and 20 illustrate how the lamp holder 43 with its band 59 is held in place by the retention members 87, 89 and how such holder 43 may be removed from the retainer 27. Referring also to FIGS. 6, 7 and 18 when the lamp holder 43 is oriented so that the reflecting axis 35 is generally parallel to the body axis 25 of the retainer 27, the relationship of the support band 59 to the retention members 87, 89 is generally as shown in FIG. 19. And the lamp holder is held in the retainer.

However, when the holder 43 with its support band 59 is rotated 90° to be oriented as in FIG. 20 so that the reflecting axis 35 is angular to the body axis 25, the band 59 "clears" the retention members 87, 89 and the holder 43 may be withdrawn through the notches 95, 101 (toward the viewer of FIG. 20) and toward the retainer face 29. To re-mount the holder 43, the procedure is reversed in that the holder 43 is oriented as shown in FIG. 20, such holder 43 is urged rearwardly (away from the viewer of FIG. 20) through the notches 95, 101 and the holder 43 is then re-oriented so that the beam axis 35 and the body axis 25 are substantially coextensive. And FIG. 19 illustrates that where the lamp holder 43 is generally circular, such holder 43 has an axis 107 coincident with a holder diameter and the notches 95, 101 are in registry with the axis 107.

Referring again to FIGS. 1, 2 and 3, one application of the new apparatus 10 is as a docking light for a boat 11 having a hull 13 with a hull long axis 109. The retainer 27 has a body 73 extending along a body axis 25 and has a flange-like face 29 mounted at the hull exterior surface 11. The face 29 is angular to the body axis 25 and the body axis 25 and the hull long axis 109 are substantially parallel to one another.

As shown in FIGS. 2, 6 and 18 and as described above, the apparatus 10 may be configured with a protective rear shroud 79. Such shroud 79 is particularly desirable in installations, e.g., in boats 11, where water may be present. But as shown in FIG. 5, such shroud 79 is probably not needed in a building installation.

Referring to the FIGURES, the method includes providing a retainer 27 having a body 73 extending along a body axis 25, and also having a notch 95 formed in the retainer 27. The lamp holder 43 is oriented so that the reflecting axis 35 is angular to the body axis 25 and, most preferably, so that such reflecting axis 35 is about perpendicular to such body axis 25. The holder 43 is then urged through the notch 95 and, thereafter, the holder 43 is re-oriented so that the reflecting axis 35 and the body axis 25 are substantially coextensive. In a more specific aspect, the notch 95 is a first notch, the retainer 27 has a second notch 101 therein and the urging step includes urging the holder 43 through both notches 95, 101.

When the holder 43 is so configured, the orienting step includes orienting the holder 43 so that the planes 65, 67 described above and shown in FIG. 13 are angular to the body axis 25. And the re-orienting step includes moving the holder 43 so that the planes 65, 67 are about perpendicular to the body axis 25. The new method may also includes steps for de-mounting the lamp holder 43. Such steps includes turning the holder 43 so that the reflecting axis 35 is angular to the body 73 and then withdrawing the holder 43 from the body through the notch 95.

As used in this specification, the term "truncated" means having a portion of a sphere of the radius R1 replaced by a plane parallel to any plane through the sphere center. In the specification, the body axis 25 and the hull long axis 109 are said to be substantially parallel to one another. In this context, "substantially parallel" means parallel within 15° to 20° or so. In the specification, the reflecting axis 35 and the body axis 25 are said to be substantially coextensive. In this context, "substantially coextensive" means parallel within 15° to 20° or so.

While the invention is described in connection with only a few preferred embodiments, it is to be understood clearly that such embodiments are by way of example and are not limiting.

What is claimed:

1. In a lighting apparatus having (a) a retainer, (b) a lamp holder held by the retainer, and (c) a lamp secured with respect to the holder, the improvement wherein:

the lamp holder has a pair of support edges spaced from one another by a first dimension;

the retainer includes first and second notches, each having a pair of notch edges spaced from one another by a second dimension greater than the first dimension, thereby permitting the holder to be removed through the notches.

2. The apparatus of claim 1 wherein:

the lamp has a reflector for directing light along a reflecting axis;

the lamp includes a rim portion and a lens forward of the rim portion;

the retainer includes a first portion forward of the rim portion and spaced from the reflecting axis; and the notches are between the rim portion and the first portion.

3. The apparatus of claim 2 wherein the retainer includes:

a retainer body around a spatial region; and a pair of retention members extending from the body into the region; and wherein:

the notches are between the retention members.

4. The apparatus of claim 1 wherein:

the lamp holder is generally circular and has an axis coincident with a holder diameter; and the notches are in registry with the reflecting axis.

5. The apparatus of claim 2 wherein:

the lamp holder is generally circular and has an axis coincident with a holder diameter; and the notches are in registry with the reflecting axis.

6. The apparatus of claim 3 including a shroud rearward of the rim portion and coupled to the retainer and wherein:

the holder is removable forward through the notches; and the shroud obstructs rearward removal of the holder.

7. The apparatus of claim 1 wherein:

the lamp holder is a truncated sphere having a first radius of curvature;

each notch has a boundary extending between the edges of a respective notch; and the boundary of at least one notch defines an arc having a second radius of curvature greater than the first radius of curvature.

8. The apparatus of claim 7 wherein the boundaries of both notches define an arc having a second radius of curvature greater than the first radius of curvature.

9. The apparatus of claim 1 including a snubber extending through the retainer and contacting the holder, thereby substantially preventing movement of such holder.

10. The apparatus of claim 1 in combination with a boat having a hull with a hull long axis and wherein:

the retainer has a body extending along a body axis and has a face mounted at the hull;

the face is angular to the body axis; and the body axis and the hull long axis are substantially parallel to one another.

11. The apparatus of claim 10 including a snubber extending through the retainer and contacting the holder, thereby holding such holder in a position.

12. A method for mounting a lamp holder having a lamp secured with respect to such holder, the lamp including a reflector for directing light along a reflecting axis, the method including:

providing a retainer having (a) a body extending along a body axis, and (b) a notch formed in the retainer;

orienting the holder so that the reflecting axis is angular to the body axis;

urging the holder through the notch; and re-orienting the holder so that the beam axis and the body axis are substantially coextensive.

13. The method of claim 12 wherein the orienting step includes orienting the holder so that the reflecting axis is about perpendicular to the body axis.

14. The method of claim 13 wherein the notch is a first notch, the retainer has a second notch therein and the urging step includes urging the holder through the notches.

15. The method of claim 12 wherein the holder is a sphere truncated along edges spaced from one another and in registry with respective planes perpendicular to the reflecting axis and the orienting step includes orienting the holder so that the planes are angular to the body axis.

16. The method of claim 12 wherein the holder is a sphere truncated along edges spaced from one another and in registry with respective planes perpendicular to the reflecting axis and the re-orienting step includes moving the holder so that the planes are about perpendicular to the body axis.

17. The method of claim 12 further including steps for de-mounting the lamp holder including:

turning the holder so that the reflecting axis is angular to the body; and withdrawing the holder from the body through the notch.

* * * * *